(12) United States Patent
Kim

(10) Patent No.: US 11,135,998 B2
(45) Date of Patent: Oct. 5, 2021

(54) SEAT BELT FOR VEHICLE

(71) Applicants: Hyundai Motor Company, Seoul (KR); KIA Motors Corporation, Seoul (KR)

(72) Inventor: Hyun Su Kim, Uiwang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 83 days.

(21) Appl. No.: 16/405,291

(22) Filed: May 7, 2019

(65) Prior Publication Data

US 2020/0180555 A1    Jun. 11, 2020

(30) Foreign Application Priority Data

Dec. 6, 2018  (KR) .................. 10-2018-0156384

(51) Int. Cl.
| | | |
|---|---|---|
| *B60R 22/34* | (2006.01) | |
| *B60R 22/26* | (2006.01) | |
| *B60R 22/02* | (2006.01) | |
| *B60R 22/48* | (2006.01) | |
| *B60R 22/18* | (2006.01) | |

(52) U.S. Cl.
CPC .......... *B60R 22/3405* (2013.01); *B60R 22/26* (2013.01); *B60R 2022/021* (2013.01); *B60R 2022/1812* (2013.01); *B60R 2022/1818* (2013.01); *B60R 2022/4816* (2013.01); *B60R 2022/4858* (2013.01)

(58) Field of Classification Search
CPC ....... B60R 22/26; B60R 22/03; B60R 22/023; B60R 22/026; B60R 22/04; B60R 2022/021; B60R 2022/006; B60R 2022/026; B60R 2022/1812; B60R 2022/1818; B60R 2022/4816; B60R 2022/4858
See application file for complete search history.

(56) References Cited

U.S. PATENT DOCUMENTS 3,613,819 A * 10/1971 Maloney ................ B60R 22/04
                                                   180/270
3,781,067 A * 12/1973 Dodson ............... B62D 55/244
                                                   305/168

(Continued)

FOREIGN PATENT DOCUMENTS

| KR | 10-1990-0012800 | 9/1990 |
| KR | 1991-0006844 B1 | 9/1991 |

*Primary Examiner* — Ruth Ilan
*Assistant Examiner* — Caitlin Anne Miller

(57) ABSTRACT

A seat belt for an occupant sitting on a seat in a vehicle includes a tongue part provided at a first side portion of the seat and a buckle part provided at a second side portion of the seat. The tongue part includes at least one first guide part that is operable between extended and contracted configurations, and at least one first webbing with a tongue wound therein. In addition, the tongue of the first webbing is connected with an end portion of the first guide part. The buckle part includes a second guide part that is operable between extended and contracted configurations, and the second webbing with a buckle wound therein. In addition, the buckle of the second webbing is connected with an end portion of the second guide part. The tongue of the tongue part is fastened to the buckle of the buckle part.

16 Claims, 10 Drawing Sheets

(56) References Cited

U.S. PATENT DOCUMENTS

| | | | | |
|---|---|---|---|---|
| 5,283,933 | A | * | 2/1994 | Wiseman ............ A44B 11/2511 24/579.11 |
| 6,965,231 | B1 | * | 11/2005 | Cinoglu ............... A61B 5/0555 324/300 |
| 2018/0043857 | A1 | * | 2/2018 | Kennair, Jr. ....... A44B 11/2542 |
| 2020/0180554 | A1 | * | 6/2020 | Song ....................... B60R 22/34 |

* cited by examiner

SEAT BELT FOR VEHICLE

CROSS-REFERENCE TO RELATED APPLICATION

This application claims priority to and the benefit of Korean Patent Application No. 10-2018-0156384, filed on Dec. 6, 2018, which is incorporated herein by reference in its entirety.

FIELD

The present disclosure relates to a seat belt fastened or released for a passenger in a vehicle.

BACKGROUND

The statements in this section merely provide background information related to the present disclosure and may not constitute prior art.

In a conventional seat belt in a vehicle, an occupant has to manually fasten the seat belt, which is inconvenient in fastening the seat belt and causes a safety issue when the occupant does not deliberately fasten the seat belt.

Particularly, since a buckle of the seat belt may be located at a rearmost position of the seat cushion depending on the structure of the vehicle, we have discovered that it is very difficult to fasten the tongue of the seat belt to the buckle when the occupant should fasten the seat belt.

In recent years, many mechanical structures in an autonomous vehicle have been developed. As one of the mechanical structures, seat belts are also integrated into a seat that is freely rotated or moved in position. However, depending on the shape and position of the seat, we have discovered that it may be difficult for the occupant to fasten the seat belt.

The above information disclosed in this Background section is only for enhancement of understanding of the background of the present disclosure, and therefore it may contain information that does not form the prior art that is already known to a person of ordinary skill in the art.

SUMMARY

The present disclosure provides to a seat belt for an occupant sitting on a seat in a vehicle.

The seat belt for a vehicle according to a form of the present disclosure may include a tongue part provided at a first side portion of the seat and a buckle part is provided at a second side portion of the seat. The tongue part includes at least one first guide part that is operable between extended and contracted configurations, and at least one first webbing with a tongue wound therein. In addition, the tongue of the first webbing is connected with an end portion of the first guide part so that the webbing is extended together when the first guide part is extended. The buckle part includes a second guide part that is operable between extended and contracted configurations and a second webbing with a buckle wound therein. In addition, the buckle of the second webbing is connected with an end portion of the second guide part so that the second webbing is extended together when the second guide part is extended. The tongue of the tongue part is fastened to the buckle of the buckle part.

According to a further aspect of the present disclosure, the tongue part may be composed of an upper tongue part provided at an upper portion of the first side portion of a seat back and a lower tongue part provided at a lower portion of the first side portion of the seat back, and tongues of each of the upper tongue part and the lower tongue part may be fastened to the buckle of the buckle part together.

According to a further aspect of the present disclosure, the buckle part may be provided at a lower portion of the second side portion of the seat back. The guide parts of the tongue part and the buckle part may be extended in a direction toward a center of a seat back.

According to a further aspect of the present disclosure, the tongue of the tongue part may be hung on the end portion of the first guide part so that the tongue of the tongue part is moved together with the end portion of the first guide part when the first guide part is extended, whereby the first webbing is extended, and the tongue may be separated from the first guide part when the first guide part is contracted after the tongue is fastened to the buckle, so that the first webbing is not contracted but only the first guide part is contracted.

According to a further aspect of the present disclosure, the buckle of the buckle part may be hung on an end portion of the second guide part so that the buckle of the buckle part is moved together with the end portion of the second guide part when the second guide part is extended, whereby the second webbing is extended, and the buckle may be separated from the second guide part when the second guide part is contracted after the tongue is fastened to the buckle, so that the second webbing is not contracted but only the second guide part is contracted.

According to a further aspect of the present disclosure, a controller detects whether the occupant sits on the seat and controls the operations of the guide parts of the tongue part and the buckle part. The controller may extend the guide parts of the tongue part and the buckle part when the occupant sits on the seat.

The controller may detect whether the tongue and the buckle are fastened to each other and wind the second webbing of the buckle part when the tongue and the buckle are fastened to each other, so that the buckle is moved to the second side portion of the seat and the first webbing of the tongue part is extended to the second side portion of the seat.

According to a further aspect of the present disclosure, the guide parts of the tongue part and the buckle part may be telescopically extended or contracted.

Each of the guide parts of the tongue part and the buckle part may be composed of a plurality of links. The end portions of each link may be connected with each other via a wire connected with a driving part, and the wire may be moved by the operation of the driving part so that the plurality of links are distant from or overlap with each other, whereby the each of the guide parts is extended or contracted.

The tongue may be installed at a terminal link farthest from the plurality of links of the guide part. The tongue may be connected with an end portion of the first webbing and the tongue may be rotated in the opposite direction of the webbing by the tension of the first webbing at the start of the extension of the terminal link, whereby the tongue protrudes from the terminal link in a direction facing to the buckle.

According to a further aspect of the present disclosure, fixing portions may be provided in the buckle in a direction facing each other, and a hooking portion may be formed at an end portion of the tongue. The fixing portions may be moved closely to each other to hook and fix the hooking portion when the hooking portion of the tongue is inserted into the buckle.

The fixing portions may receive an elastic force in the direction facing each other in the buckle, and the fixing portions may hook and fix the hooking portion of the tongue via the elastic force when the hooking portion of the tongue is inserted into the buckle to be positioned between the fixing portions.

The fixing portions may be connected with an actuator. The actuator may operate the fixing portions in an opposite direction away from each other when the seat belt is released so that the hooking portion of the tongue can be drawn out from the buckle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
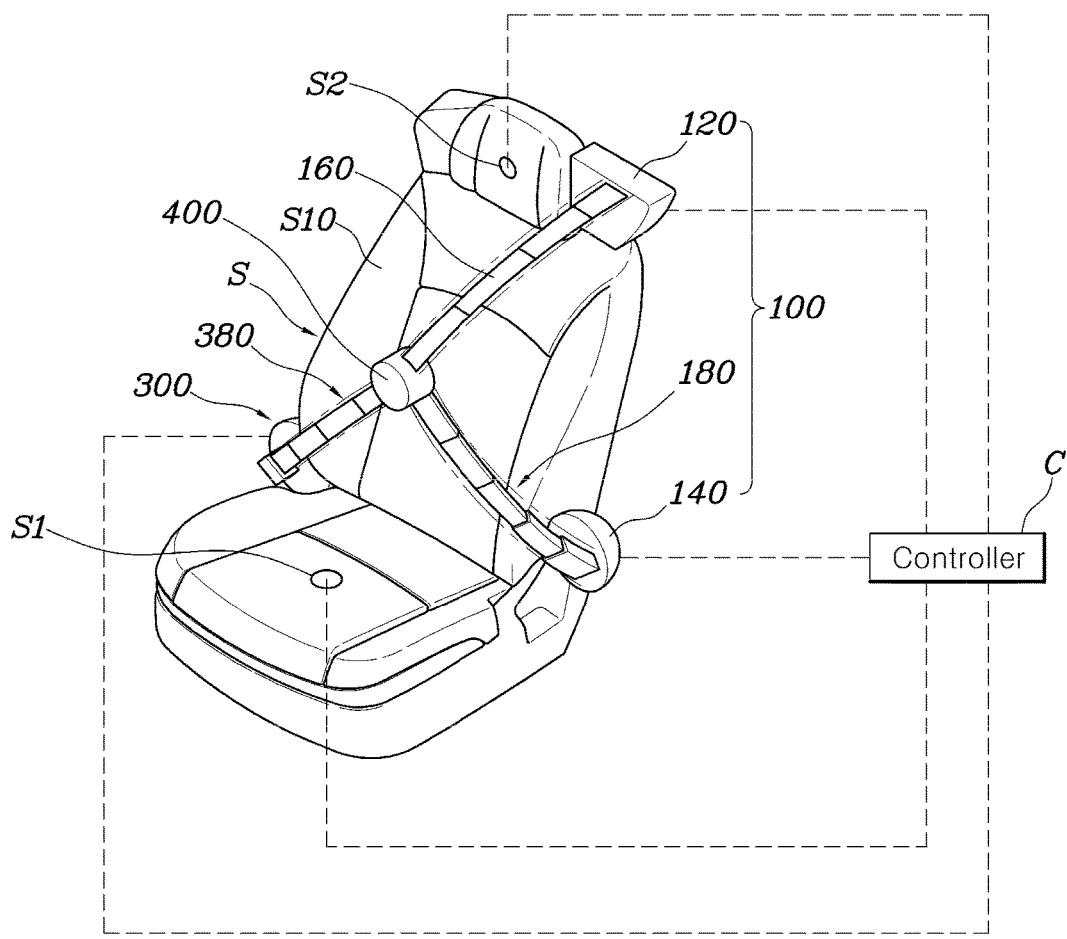
FIG. 1 depicts a seat belt mounted at a seat for a vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawing, corresponding reference numerals indicate like or corresponding parts and features.

Figure 2:
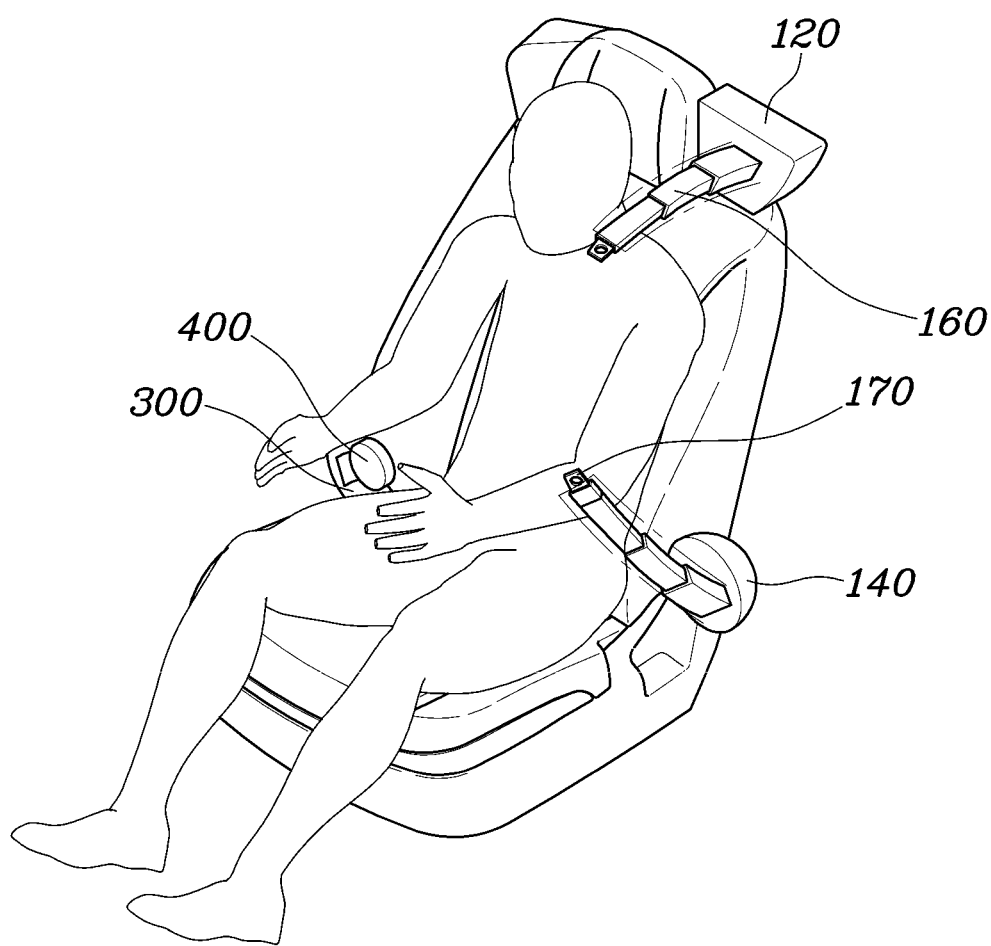
FIGS. 2 to 4 depict an operation process of fastening the seat belt for the vehicle according to the exemplary form of the present disclosure.

Referring to FIGS. 1 and 2, a seat belt for a vehicle according to a form of the present disclosure may include a tongue part 100 provided at a first side portion of a seat S. The tongue part 100 includes at least one first guide part 180 that is operable between extended and contracted configurations and at least one first webbing 160 with a tongue 170 spirally wound therein. The tongue 170 of the first webbing 160 is connected with an end portion of the first guide part 180 so that the first webbing 160 is extended together when the first guide part 180 is extended. A buckle part 300 provided at a second side portion of the seat S includes a second guide part 380 that is operable between extended and contracted configurations, and a second webbing 360 with a buckle 400 spirally wound therein. The buckle 400 of the second webbing 360 is connected with an end portion of the second guide part 380 so that the second webbing 360 is extended together when the second guide part 380 is extended. Accordingly, the tongue 170 of the tongue part 100 is fastened to the buckle 400 of the buckle part 300.

In the seat belt for the vehicle of the present disclosure, a belt module is integrally provided at the seat so that it is able to apply to an autonomous vehicle. Furthermore, when the passenger sits on the seat, it is detected so that the webbing of the seat belt is automatically extended and fastened, and the seat belt is automatically released when releasing it. Accordingly, the passenger can conveniently fasten or release the seat belt.

As shown in FIGS. 1 and 2, the seat belt for the vehicle of the present disclosure may be composed of the tongue part 100 and the buckle part 300. The tongue part 100 may be provided at the first side portion of the seat S and provided with the first guide part 180 that is operable between extended and contracted configurations, and the first webbing 160 with the tongue 170 spirally wound therein. The tongue 170 of the first webbing 160 is connected with the end portion of the first guide part 180 so that the first webbing 160 is extended together when the first guide part 180 is extended.

As shown in FIGS. 1 and 2, the tongue part 100 may be composed of an upper tongue part 120 provided at an upper portion of one side portion of a seat back S10 and a lower tongue part 140 provided at a lower portion of one side portion of the seat back S10. The respective tongues 170 of the upper tongue part 120 and the lower tongue part 140 may be fastened to the buckle 400 of the buckle part 300 together.

On the other hand, the buckle part 300 may be provided at a lower portion of the other side (second side) portion of the seat back S10 and provided with the second guide part 380 that is operable between extended and contracted configurations. The buckle part 300 further includes the second webbing 360 with the buckle 400 spirally wound therein. The buckle 400 of the second webbing 360 may be connected with the end portion of the second guide part 380 so that the second webbing 360 is extended together when the second guide part 380 is extended and the tongue 170 of the tongue part 100 is fastened to the buckle 400. In addition, the buckle part 300 may be provided at the lower portion of the other side portion of the seat back S10. Through this configuration, a 3-point belt is automatically implemented so that the complete safety of the occupants can be easily achieved.

Specifically, the webbings 160 and 360 and the guide parts 180 and 380 may be provided at the tongue part 100 and the buckle part 300, respectively. The webbings 160 and 360 may be tensioned in the direction always received through a retractor provided inside the tongue part 100 and the buckle part 300, respectively. In addition, the guide parts 180 and 380 may be configured to guide the webbings 160 and 360 of the tongue part 100 and the buckle part 300 to be automatically extended to a predetermined point, respectively. When the passenger wears the seat belt and is fastened by the webbings 160 and 360, the guide parts 180 and 380 may be returned and housed inside the tongue part 100 and the buckle part 300, respectively so that the other parts except the webbings 160 and 360 are not contacted to the passengers.

Figure 3:
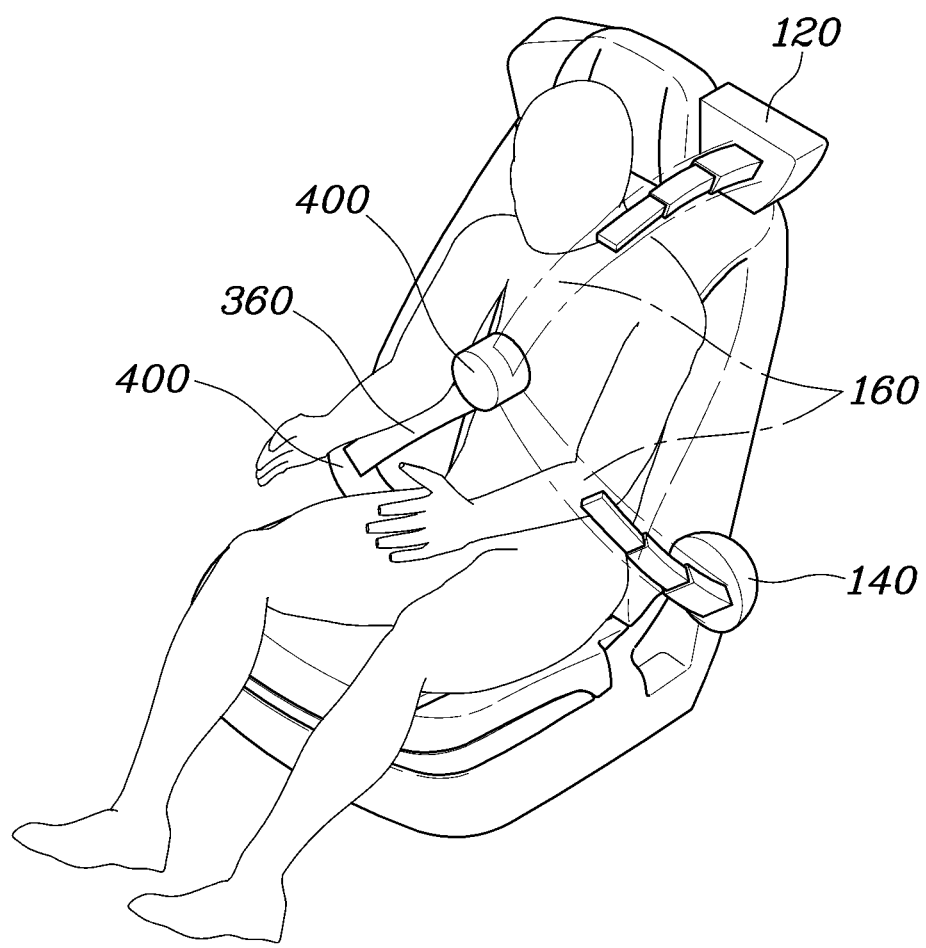
Figure 4:
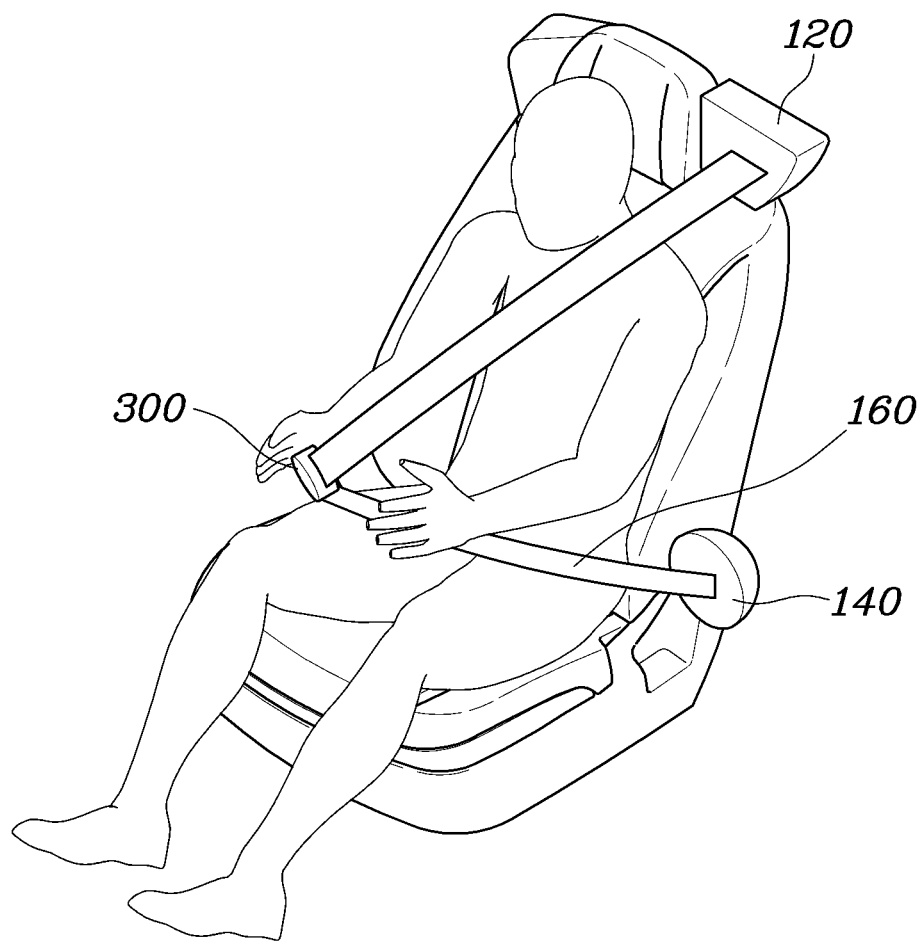

FIGS. 2 to 4 are illustrating an operation process of fastening the seat belt for the passenger according to an exemplary form of the present disclosure. When the passenger sits on the seat, a controller C may detect and control the webbings 160 and 360 of the tongue part 100 and the buckle part 300 through the guide parts 180 and 380 to extend towards the center of the body of the passenger.

According to the exemplary form of the present disclosure, the controller C detects whether the passenger sits on the seat, and controls the operations of the guide parts 180 and 380 of the tongue part 100 and the buckle part 300.

As shown in FIGS. 1 through 4, the controller C may determine whether the passenger fully sits on the seat through a sensor S1 of a seat cushion and a second sensor S2 of a headrest when the passenger sits on the seat. In addition, the controller C causes the guide parts 180 and 380 of the tongue part 100 and the buckle part 300 to extend, respectively. Thereafter, the controller C may detect whether the tongues 170 and the buckle 400 are fastened to each other through the sensor of the buckle 400, and retract the guide parts 180 and 380 of the tongue part 100 and the buckle part 300 to house them when the tongues 170 and the buckle 400 are fastened to each other. Additionally, the controller C may wind the second webbing 360 of the buckle part 300 through an electronic retractor, so that the buckle 400 moves to the lower portion of the other side (second side) portion of the seat back and the first webbings 160 of the tongue part 100 can be extended to the other side portion of the seat back. Through this process, the passenger can automatically wear the 3-point belt as the conventional seat belt.

Figure 5:
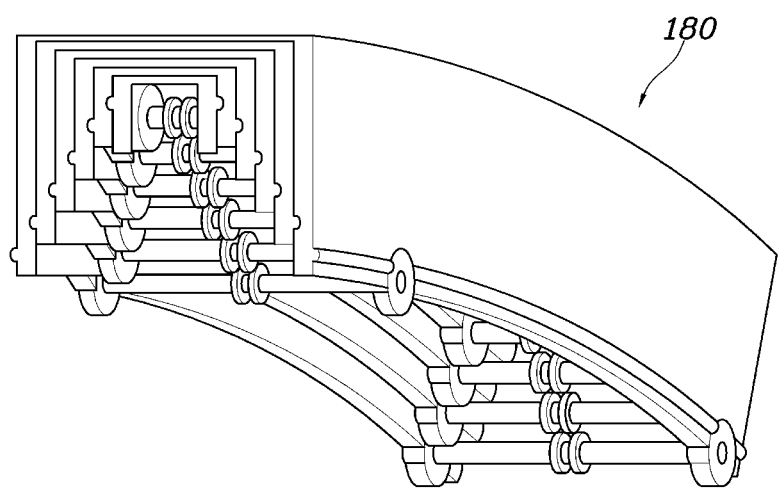
FIGS. 5 and 6 depict a guide part of the seat belt for the vehicle according to the exemplary form of the present disclosure.
Figure 6:
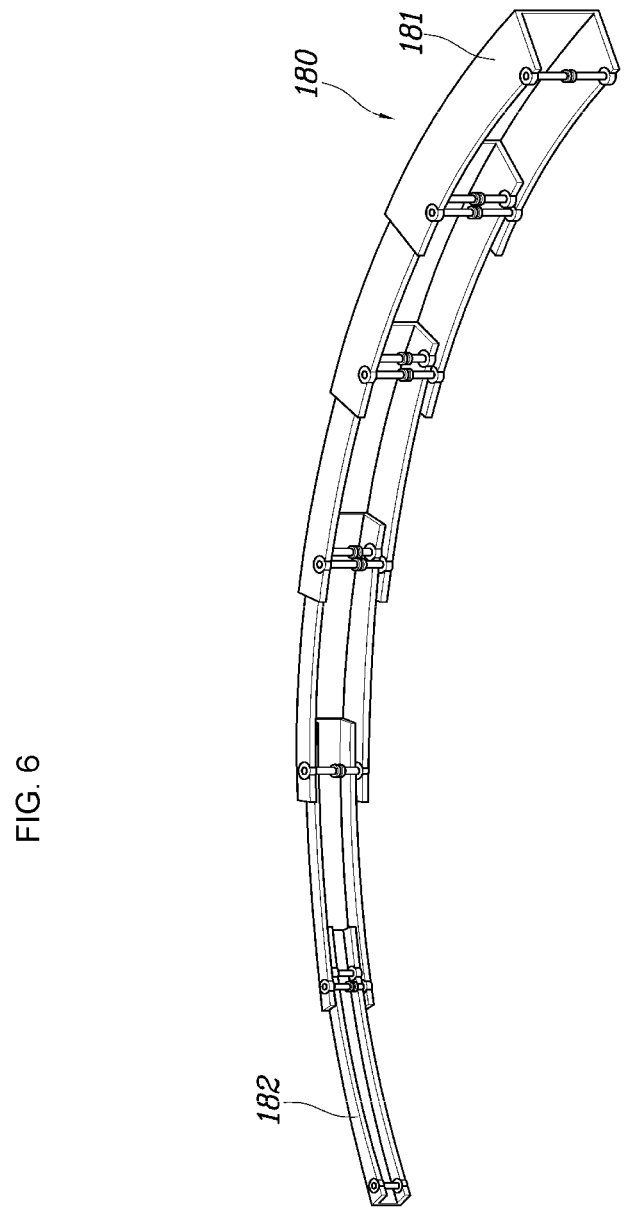
Figure 7:
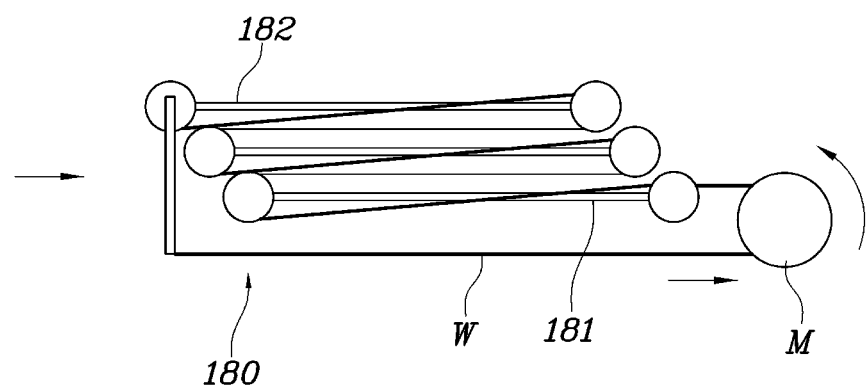
FIGS. 7 and 8 depict an operation of a plurality of links in the guide part of the seat belt according to the exemplary form of the present disclosure.
Figure 8:
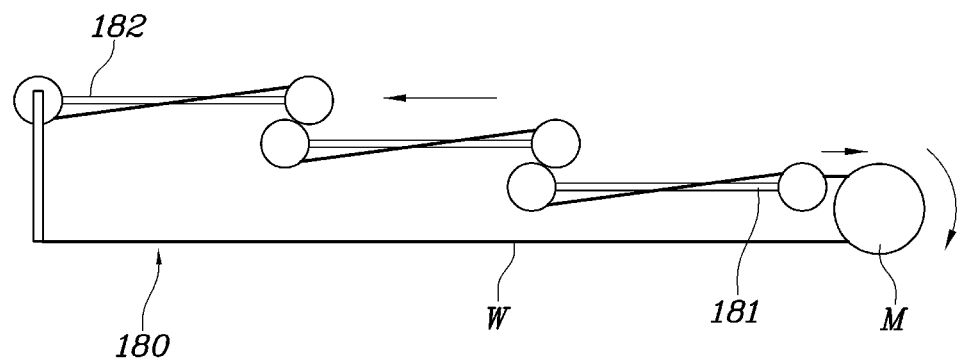

FIGS. 5 and 6 are illustrating one of the guide parts 180 and 380 of the seat belt for the vehicle according to the exemplary form of the present disclosure, and FIGS. 7 and 8 are illustrating the operation of one of the guide parts 180 and 380 of the seat belt for the vehicle according to the exemplary form of the present disclosure. The guide parts 180 and 380 of the tongue part 100 and the buckle part 300 can be extended or contracted telescopically. In the exemplary form shown in FIGS. 5 through 8, the first guide part 180 of the tongue part 100 is illustrated, but the second guide part 380 of the buckle part 300 is also configured by the same way.

The guide parts 180 and 380 of the tongue part 100 and the buckle part 300 may be each composed of a plurality of links 181 (shown only in the tongue part 100). FIG. 5 shows a state in which the plurality of links 181 are overlapped with each other and housed, and FIG. 6 shows a state in which the plurality of links 181 are elongated and the first guide part 180 is extended forward as a whole.

The end portions of each link 181 may be connected with each other via a wire W as shown in FIGS. 7 and 8. In addition, one end portion of the wire W may be connected with an upper portion of the terminal link 182 and the other end portion thereof may be connected with a lower portion of the terminal link 182 again. When rotating a driving part M in a counterclockwise direction, the other end portion of the wire W is pulled as shown in FIG. 7 and the lower portion of the terminal link 182 is pulled to the driving part M. Further, the one end portion of the wire W is released in an opposite side and the length of the wire is secured by the displacement at which the wire W is released so that the links 181 of the guide part 180 are overlapped and housed as shown in FIG. 7.

In this state, in case of rotating the wire W in a clockwise direction as shown in FIG. 8, since the one end portion of the wire W is pulled, the links 181 of the guide part 180 are forced to unfold in a direction away from each other by a displacement at which the wire W is pulled. Further, the other end portion of the wire W is automatically released by a displacement at which the wire W is pulled so that the terminal link 182 can move forward.

Figure 9:
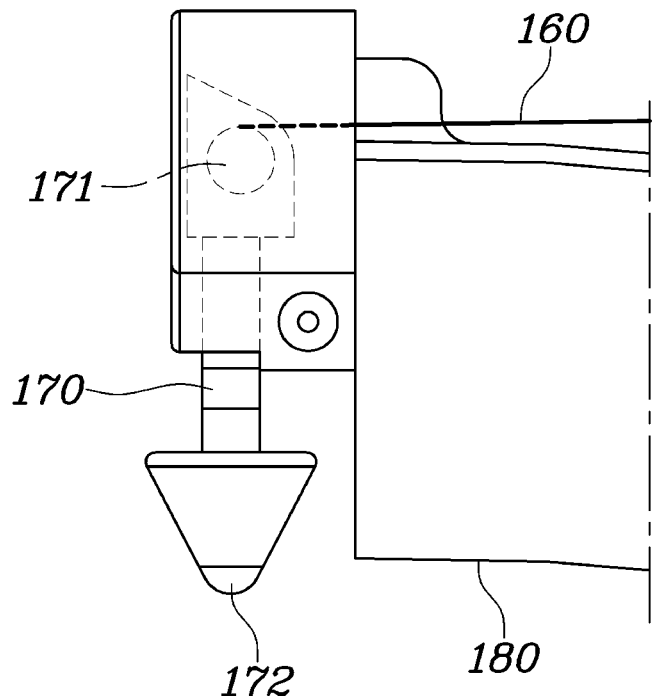
FIGS. 9 and 10 depict an operation of a tongue of the seat belt according to the exemplary form of the present disclosure.
Figure 10:
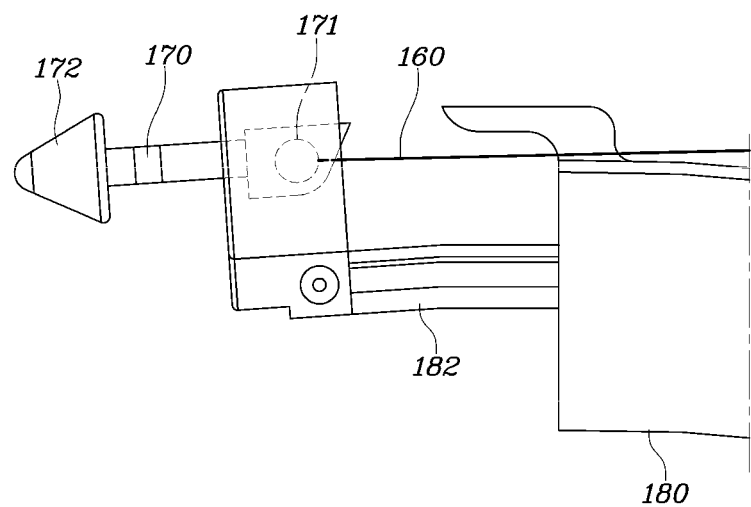
Figure 11:
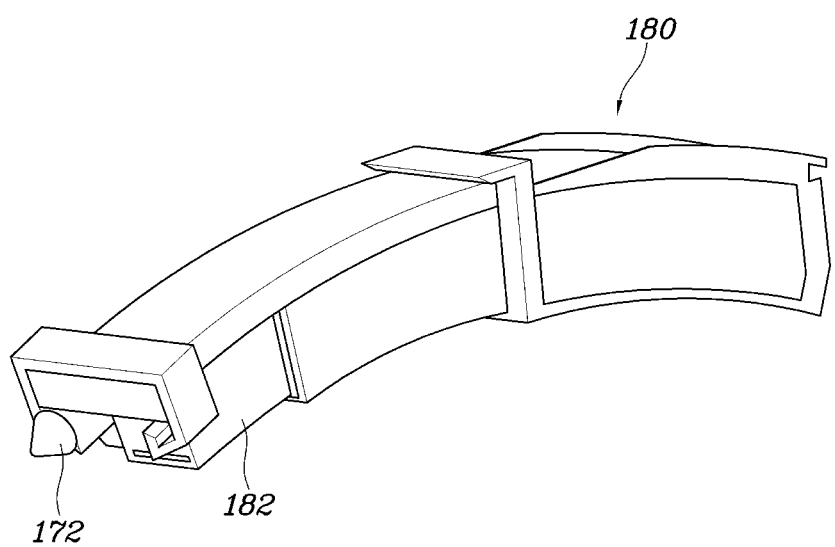
FIG. 11 depicts a state in which the tongue is protruded from the guide part of the seat belt for the vehicle according to the exemplary form of the present disclosure.

FIGS. 9 through 11 are illustrating the operation of the tongue 170 of the seat belt for the vehicle according to the exemplary form of the present disclosure. The tongue 170 may be installed through a rotating shaft 171 at the terminal link 182 farthest from the plurality of links 181 of the guide part 180 as shown in FIGS. 9 and 10. The tongue 170 may be a structure that is free to rotate on the terminal link 182 relative to the rotating shaft 171. The tongue 170 may be connected with the end portion of the webbing 160 through the upper end portion of the rotating shaft 171.

As shown in FIG. 9, the tongue 170 may be normally oriented downward, but the webbing 160 will stay in place for some time due to its tension at the beginning of the extension of the terminal link 182 as shown in FIG. 10 and the terminal link 182 of the guide part 180 begins to advance, whereby the tongue 170 is pulled by the webbing 160 and the rotating shaft 171 of the tongue 170 is rotated based on the terminal link 182. As a result, the tongue 170 may be protruded in a forward direction from the terminal link 182 as shown in FIG. 10. Accordingly, in case that the guide part 180 is extended to wear the seat belt, the tongue 170 is also protruded to be fastened to the buckle 400. Conversely, in the case that the guide part 180 and the webbing 160 are housed, the tongue 170 is also housed in a manner that is closely attached to the guide part 180. Furthermore, the action of the retractor should also be designed so that the tension on the webbing 160 no longer acts in the housed condition in order that the tongue 170 can be in close contact with the guide part 180 in the housed condition.

On the other hand, the tongue 170 of the tongue part 100 is hung on the end portion of the terminal link 182 of the guide part 180 so that it is moved with the end portion of the terminal link 182 of the guide part 180 and the webbing 160 is extended when the guide part 180 is extended. when the guide part 180 is contracted and returned after the tongue 170 is fastened to the buckle 400, the tongue 170 is separated from the guide part 180 so that the webbing 160 is not contracted but only the guide part 180 is contracted and returned. That is, in case of allowing the tongue 170 to snap into the interior of the guide part 180 from the rear, the tongue 170 is dragged along with the terminal link 182 to advance together at the advance of the guide part 180. In case that the guide part 180 retracts conversely, only the guide part 180 is retreated and the tongue 170 is kept fixed on the buckle 400.

Accordingly, as shown in FIGS. 3 and 4, the buckle 400 of the buckle part 300 is hooked to the end portion of the second guide part 380 so that it moves together with the end portion of the second guide part 380 and the second webbing 360 is extended when the second guide part 380 is extended. When the second guide part 380 is contracted after the tongue 170 is fastened to the buckle 400, the buckle 400 is separated only from the second guide part 380 so that the second webbing 360 is not contracted but only the second guide part 380 is contracted and returned.

Figure 12:
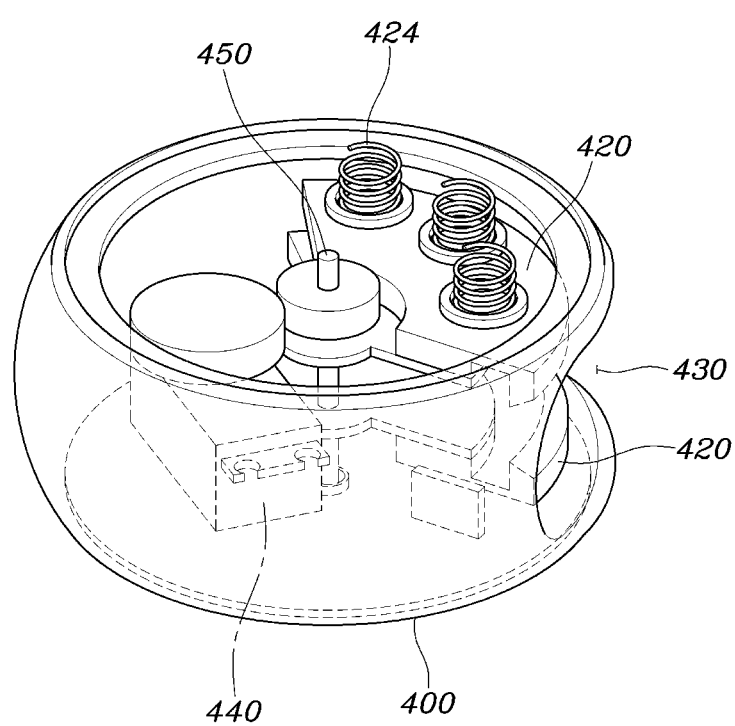
FIGS. 12 to 14 depict a buckle of the seat belt for the vehicle according to the exemplary form of the present disclosure.
Figure 13:
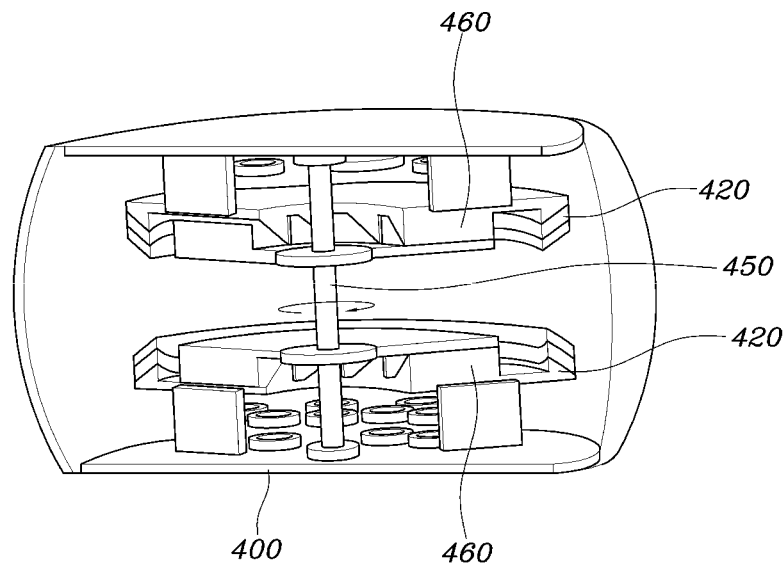
Figure 14:
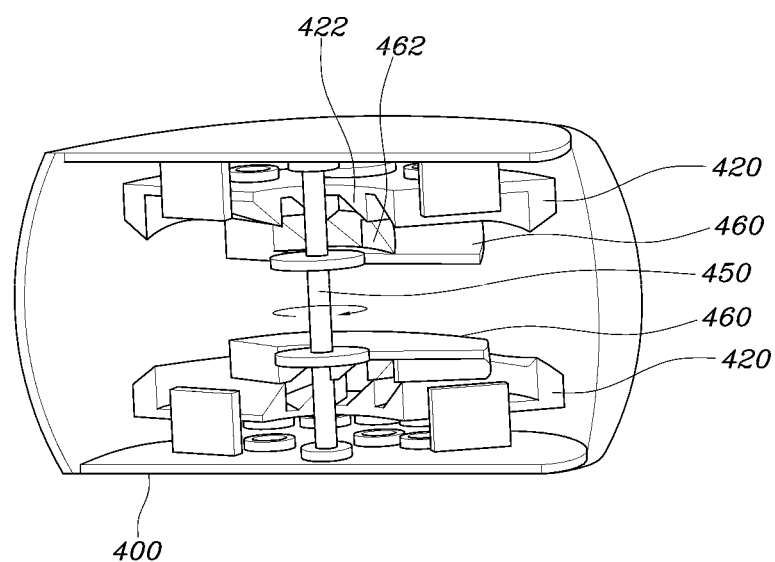

FIGS. 12 to 14 are showing the buckle 400 of the seat belt for the vehicle according to the exemplary form of the present disclosure. Fixing portions 420 may be provided in the buckle 400 in a direction facing each other and a hooking portion 172 may be formed at the end portion of the tongue 170 (See FIGS. 9 through 11). When the hooking portion 172 of the tongue 170 is inserted into the buckle 400, the fixing portions 420 are moved closely to each other to hook and fix the hooking portion 172.

As shown in FIG. 12, the fixing portions 420 may be subjected to an elastic force by a spring 424 in the direction opposite to each other inside the buckle 400. Further, in case that the hooking portion 172 of the tongue 170 is inserted into the buckle 400 through a hole 430 to be contacted with the fixing portions 420, the hooking portion 172 of the tongue 170 pushes the fixing portions 420 outwardly and is positioned between the fixing portions 420. In this case, the fixing portions 420 are returned to their original positions in a direction facing each other by the elastic force of the spring 424 again. Accordingly, the buckle 400 hooks and fixes the hooking portion 172 of the tongue 170.

In FIGS. 13 and 14, a moving portion 460 may be provided on the inner side of the fixing portion 420 so as to face the fixing portion 420 each other. The moving portion 460 and the fixing portion 420 may be formed with gear teeth 422 and 462, respectively, on opposing surfaces. The moving portion 460 may be connected with an actuator 440 through a reducer (See FIG. 12). Upon request of the controller C to release the seat belt, the actuator 440 rotates to rotate the moving portion 460 to the rotating shaft 450, and the rotation of the moving portion 460 causes the gear teeth 462 of the moving portion 460 to push the gear teeth 422 of the fixing portion 420 so that the fixing portions 420 are moved away from each other.

Further, the tongue 170 is pulled by the retractor and the webbing 160 by operating the fixing portions 420 in a direction away from each other. As a result, the hooking portion 172 of the tongue 170 may be drawn out from the buckle 400. Through this process, the seat belt is automatically fastened by the controller and the guide to the fixed path of the guide part 180 when worn, and even when released, the seat belt is released by releasing the buckle by the controller.

In accordance with the seat belt for the vehicle of the present disclosure, it is possible to provide a seat belt that is automatically driven so that the passenger can conveniently fasten or release the seat belt.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the scope of the present disclosure.

What is claimed is:

1. A seat belt for an occupant sitting on a seat including a seat back in a vehicle, the seat belt comprising:
   a tongue part provided at a first side portion of the seat, the tongue part including at least one first guide part that is operable between extended and contracted configurations, and at least one first webbing with a tongue wound therein, wherein the tongue of the first webbing is connected with an end portion of the first guide part so that the first webbing is extended together when the first guide part is extended; and
   a buckle part provided at a second side portion of the seat, the buckle part including a second guide part that is operable between extended and contracted configurations, and a second webbing with a buckle is wound therein, wherein the buckle of the second webbing is connected with an end portion of the second guide part so that the second webbing is extended together when the second guide part is extended,
   wherein:
      the tongue of the tongue part is fastened to the buckle of the buckle part,
      the tongue of the tongue part is hung on the end portion of the first guide part so that the tongue of the tongue part is moved together with the end portion of the first guide part when the first guide part is extended, whereby the first webbing is extended, and
      the tongue is separated from the first guide part when the first guide part is contracted after the tongue is fastened to the buckle, so that the first webbing is not contracted but only the first guide part is contracted.

2. The seat belt of claim 1, wherein:
   the tongue part is composed of an upper tongue part provided at an upper portion of the first side portion of the seat back and a lower tongue part provided at a lower portion of the first side portion of the seat back; and
   the respective tongues of the upper tongue part and the lower tongue part are fastened to the buckle of the buckle part together.

3. The seat belt of claim 1, wherein the buckle part is provided at a lower portion of the second side portion of the seat back.

4. The seat belt of claim 1, wherein the guide parts of the tongue part and the buckle part are extended in a direction toward a center of the seat back.

5. The seat belt of claim 1, wherein:
   the buckle of the buckle part is hung on the end portion of the second guide part so that the buckle of the buckle part is moved together with the end portion of the second guide part when the second guide part is extended, whereby the second webbing is extended; and
   the buckle is separated from the second guide part when the second guide part is contracted after the tongue is fastened to the buckle, so that the second webbing is not contracted but only the second guide part is contracted.

6. The seat belt of claim 1, further comprising a controller detecting whether the occupant sits on the seat and controlling operations of the guide parts of the tongue part and the buckle part.

7. The seat belt of claim 6, wherein the controller extends the guide parts of the tongue part and the buckle part when the occupant sits on the seat.

8. The seat belt of claim 6, wherein the controller detects whether the tongue and the buckle are fastened to each other and winds the second webbing of the buckle part when the tongue and the buckle are fastened to each other, so that the buckle is moved to the second side portion of the seat and the first webbing of the tongue part is extended to the second side portion of the seat.

9. The seat belt of claim 1, wherein the guide parts of the tongue part and the buckle part are telescopically extended or contracted.

10. The seat belt of claim 9, wherein:
    each of the guide parts of the tongue part and the buckle part is composed of a plurality of links;
    end portions of each link are connected with each other via a wire;
    the wire is connected with a driving part; and
    the wire is moved by an operation of the driving part so that the plurality of links are distant from or overlap with each other, whereby the each of the guide parts is extended or contracted.

11. The seat belt of claim 10, wherein:
    the tongue is installed at a terminal link farthest from the plurality of links of the guide part;
    the tongue is connected with an end portion of the first webbing; and
    the tongue is rotated in an opposite direction of the first webbing by a tension of the first webbing at a start of the extension of the terminal link, whereby the tongue protrudes from the terminal link in a direction facing to the buckle.

12. The seat belt of claim 1, wherein:

fixing portions are provided in the buckle in a direction facing each other;

a hooking portion is formed at an end portion of the tongue; and the fixing portions are moved closely to each other to hook and fix the hooking portion when the hooking portion of the tongue is inserted into the buckle.

13. The seat belt of claim 12, wherein:

the fixing portions receive an elastic force in the direction facing each other in the buckle; and the fixing portions hook and fix the hooking portion of the tongue via the elastic force when the hooking portion of the tongue is inserted into the buckle to be positioned between the fixing portions.

14. The seat belt of claim 13, wherein:

the fixing portions are connected with an actuator; and the actuator operates the fixing portions in an opposite direction away from each other when the seat belt is release so that the hooking portion of the tongue can be drawn out from the buckle.

15. The seat belt of claim 1, wherein the first webbing is spirally wound in the tongue part.

16. The seat belt of claim 1, wherein the second webbing is spirally wound in the buckle part.

* * * * *